Figure 1:
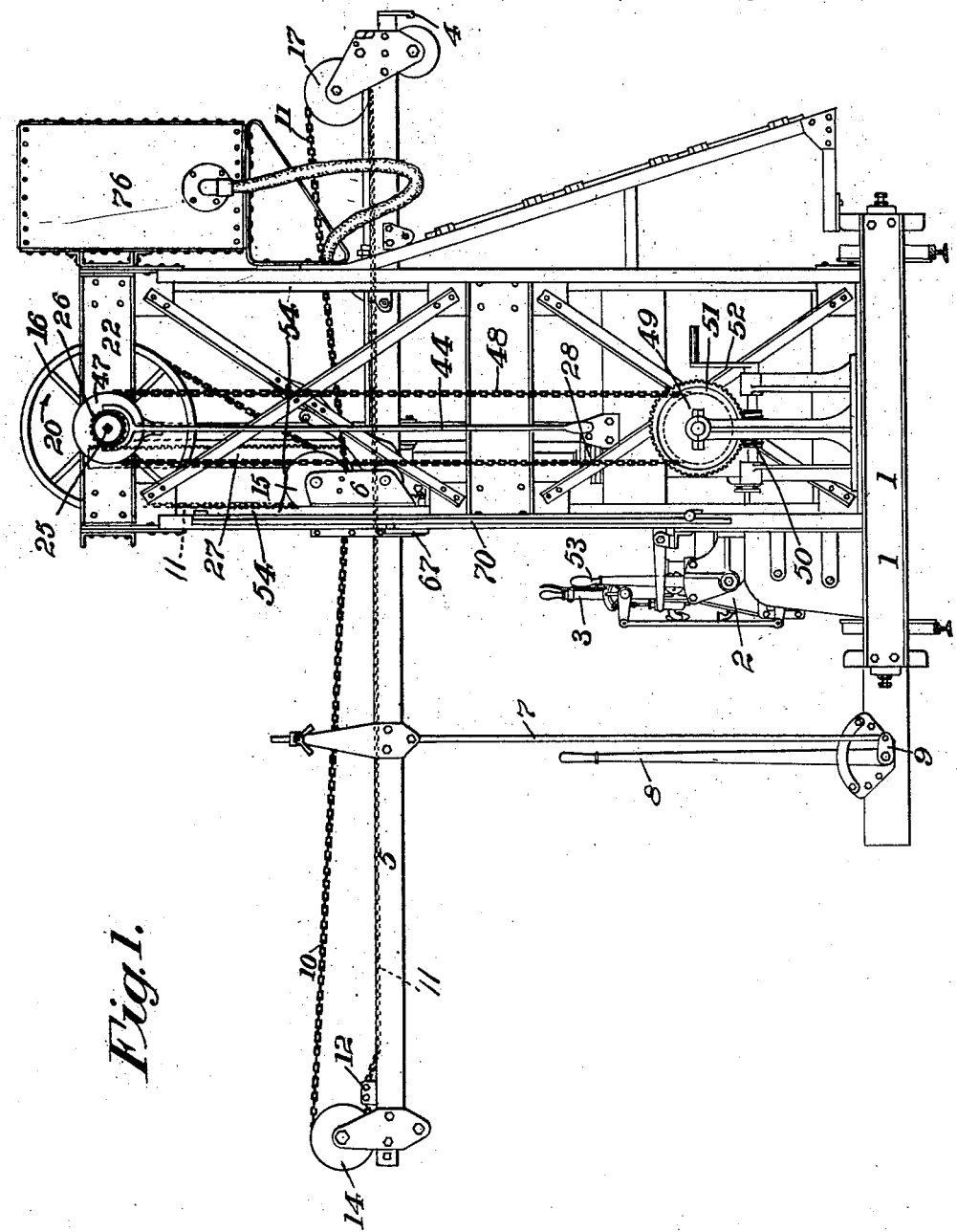

No. 880,439. PATENTED FEB. 25, 1908.
H. E. CARPENTER.
MECHANISM FOR OPERATING THE RAKE AND RAKE CARRIAGE
OF RETORT DRAWING MACHINES.
APPLICATION FILED MAY 22, 1905.

3 SHEETS—SHEET 1.

Witnesses:
P. A. Williams
James C. Herron

Inventor;
Harold E. Carpenter
By John H. Roney
his Attorney.

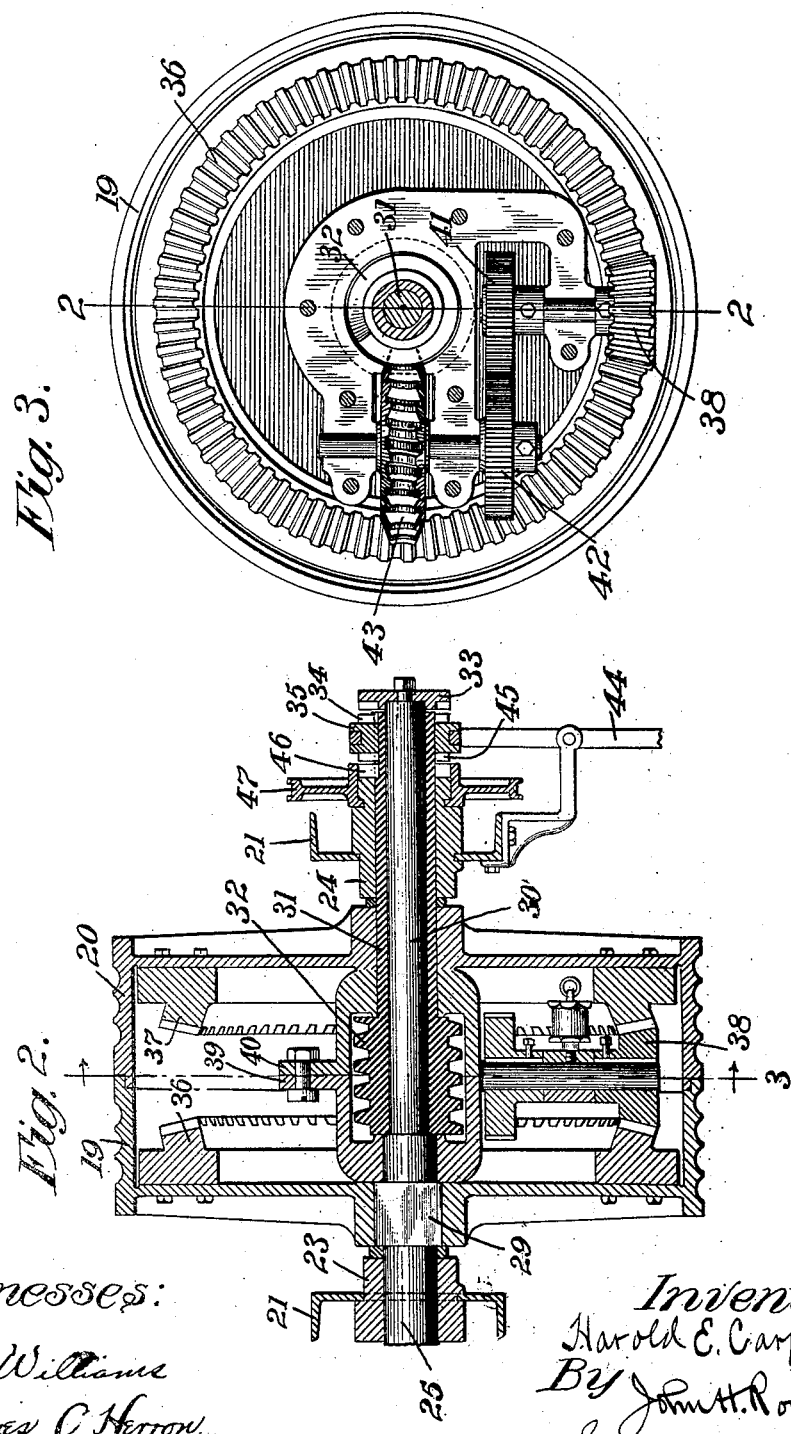

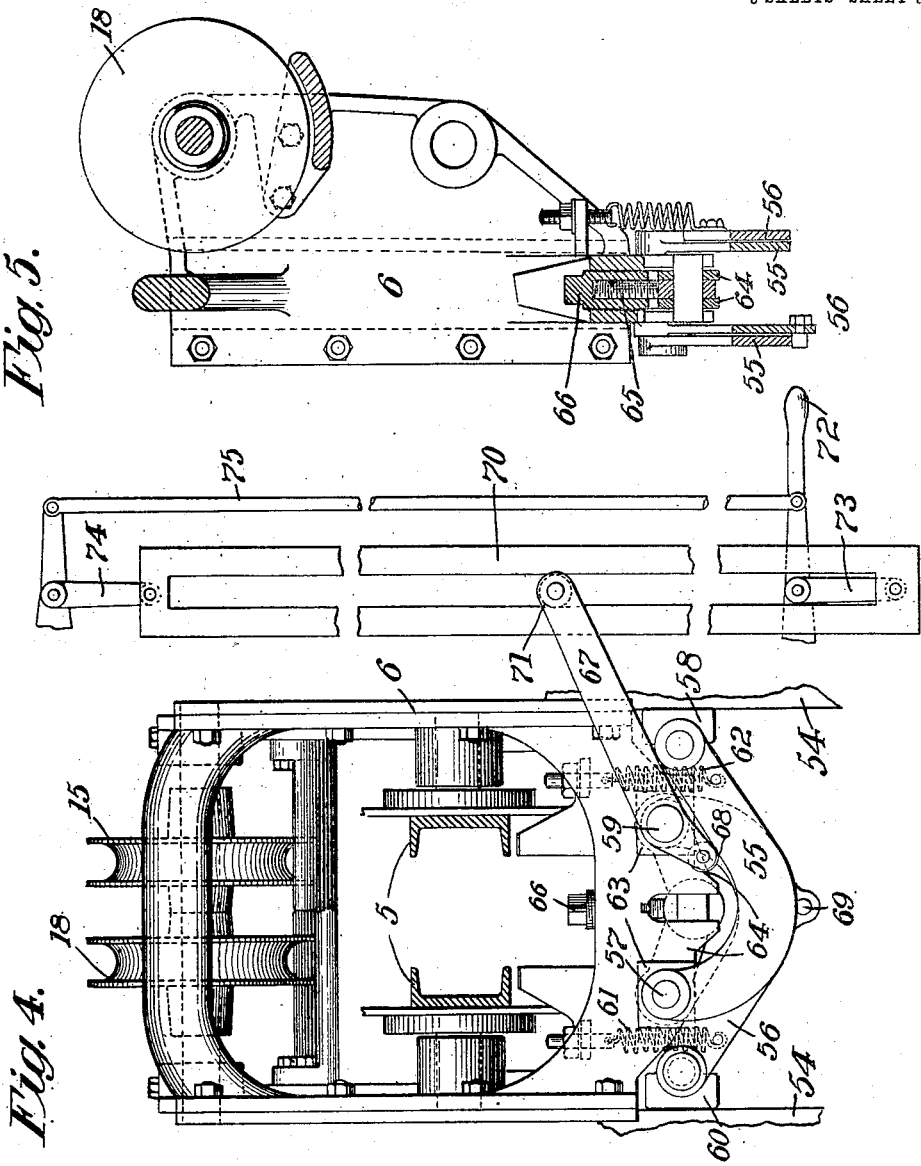

UNITED STATES PATENT OFFICE.

HAROLD E. CARPENTER, OF SEWICKLEY, PENNSYLVANIA, ASSIGNOR TO RITER-CONLEY MANUFACTURING COMPANY, OF JERSEY CITY, NEW JERSEY, A CORPORATION OF NEW JERSEY.

MECHANISM FOR OPERATING THE RAKE AND RAKE-CARRIAGE OF RETORT-DRAWING MACHINES.

No. 880,439.

Specification of Letters Patent.

Patented Feb. 25, 1908.

Application filed May 22, 1905. Serial No. 261,631

*To all whom it may concern:*

Be it known that I, HAROLD E. CARPENTER, a citizen of the United States, residing at Sewickley, in the county of Allegheny and State of Pennsylvania, have invented a new and useful Improvement in Mechanism for Operating the Rake and Rake-Carriage of Retort-Drawing Machines, of which improvement the following is a specification.

My invention relates to improvements in mechanism for elevating and lowering the rake and rake carriage of gas retort drawing machines, and to mechanism for advancing and withdrawing the rake from the retort.

The object of my invention is to provide such machines with combined mechanism adapted to elevate the carriageways and rake, and to advance and withdraw the rake from the retort, and to this purpose my invention consists in the novel construction and arrangement of parts hereinafter more specifically described, reference being had to the accompanying drawings, in which—

Figure 1 is a side elevation of my improved drawing machine. Fig. 2 is a sectional elevation, taken on the line 2—2 of Fig. 3, of the drum, by which the movement of the rake and elevation of the carriage carrying the same is actuated. Fig. 3 is a similar view taken on the line 3—3 of Fig. 2, looking in the direction of the arrow. Fig. 4 is a rear elevation of the friction carriage support and the means for actuating the same. Fig. 5 is a central, sectional elevation of Fig. 4, the carriage being omitted for clearness of illustration.

In carrying out my invention, the base frame or truck 1 is provided with a motor 2, suitably mounted on the frame and suitably connected with the wheels of said truck, whereby the entire machine may be moved laterally in front of any bench of retorts, the operation of said motor being controlled by the hand lever 3.

The drawing rake 4 is slidably mounted in the carriage 5 which is pivotally mounted in the carriage support 6, the said carriage having adjustably connected to it, between its pivotal point and its rear end, the tilting rod 7, which is connected with the tilting lever 8, by means of the crank 9. It will thus be seen that the carriage carrying the drawing rake may be so tilted that the forward end of the rake may be elevated when entering, and lowered when the same is leaving the retort, thereby positively drawing the coke.

The rake is actuated through the medium of the chains 10 and 11, the former of which is connected to the part 12, secured to the outer end of the rake and passes around the roller 14 which is journaled in bearings secured to the rear of the carriage, thence around the roller 15 journaled in bearings formed in the carriage support and to the drum 16 around which it is carried from left to right over the top of said drum, as shown in Fig. 1. The other of said chains is connected to the part 12, thence around the roller 17, mounted in the forward end of the carriage, thence around the roller 18 mounted in the carriage support and is wound onto the drum 16 in an opposite direction to the chain 10. It will thus be seen that the rotation of the drum in the direction of the arrow shown in Fig. 1 would pay out the chain 10, while the chain 11 would be wound on the drum, thus positively forcing the rake forward, while should the rake be in its forward position, a reverse movement of the drum would cause the rake to be drawn back into the carriage.

Referring to Fig. 2, it will be noted that the drum 16 is composed of two members 19 and 20, the chain 10 being wound onto the member 20 while the chain 11 is wound on the member 19 in an opposite direction. By rotating the members 19 and 20 in unison, the forward or backward movement of the rake would be effected, but should the two sections be differentially rotated, more or less chain would be wound on the drum, whereby the length of chain between said drum 16 and the part 12, to which the other ends of the chain are secured would be increased or diminished. The drum revolving around a fixed axis, and the distance between the rollers 14 and 15 and 17 and 18 being fixed, this difference in chain length would be compensated for between the drum 16 and the rolls 15 and 18; thus the differential movement of the sections 19 and 20 forming the drum would increase or decrease the distance between said drum and rolls 15 and 18, which, being mounted in the carriage support would raise or lower the said carriage and rake carried thereby.

The means which I employ for the above described movements of the drum sections will now be described.

Formed in either of the upper side frames 21 and 22 are the bearings 23 and 24 and passing through the bearing 23 is the shaft 25 on the outer end of which the pinion 26 is secured, and a rack 27 which is actuated by the ram 28, is adapted to actuate the said pinion thus revolving the shaft 25. The said shaft has a squared portion 29, near the bearing 23 and upon this squared portion 29 the member 19 of the drum is secured. This shaft is again formed round as at 30, and extends through the sleeve 31 upon which the worm gear 32 is formed and on the end of the shaft a notched plate 33, is secured, the said plate being adapted to be engaged by teeth 34 formed on the clutch member 35 which is slidably connected to the sleeve 31 by a spline or feather connection.

Mounted on the inner side of either of the members 19 and 20 are the bevel gears 36 and 37, and a bevel pinion 38 is slidably mounted between these bevel gears 36 and 37. The bevel pinion 38 has a bearing in a bracket or casing which is composed of two parts 39 and 40, and connected to said bevel pinion is the gear 41 which meshes with the gear 42, connected to the worm gear 43 which in turn meshes with and is driven by the worm 32, on the sleeve 31.

It will be seen that were the shaft 25 connected with the sleeve 31, through the clutch member 35 which is actuated by the handle 44, the said worm 32 would be prevented from turning on the shaft 25, thereby through its connecting gearing, preventing the revolution of the bevel pinion 38, whereby the two members 19 and 20 would be relatively locked, although the entire drum could be rotated by revolving the shaft 25.

Should it be desired to raise or lower the carriage, the handle 44 is moved to such a position that the teeth 45 on the clutch member 35 would engage teeth 46 on the sprocket wheel 47 at which time the teeth 33 would be disengaged from the teeth 34 thereby freeing the sleeve 31 from the shaft 25 when the said shaft, being held by the rack 27 and pinion 26 would be prevented from turning. but the rotation of the sprocket wheel 47 would rotate the worm 32 which would, through its connecting gearing rotate the bevel pinion 38 thereby changing the relation of the member 19 to the member 20 and carrying out the operation described in connection with the raising and lowering of the carriage.

The sprocket wheel 47 is preferably actuated by an endless chain 48 which, at its lower end passes around the sprocket 49, which is actuated by the worm 50 meshing with the worm gear 51 which is secured to said sprocket 49 and the worm 50 has a crank 52 and handle for revolving said worm. A handle 53 is provided on the machine for the purpose of controlling the movement of the ram 28 which operates the rack 27.

The carriage support operates in the usual manner over suitable guides 54 formed in the frame of the machine and in order that the chains 10 and 11 may be relieved of the weight of said carriage and rake when the same is not being raised or lowered, the friction support such as illustrated in Figs. 4 and 5 is provided. This support consists of the four levers, 55, 55 and 56, 56, the levers 55, 55, of which are pivoted to the adjustable pin 57 and extend across the center of the machine and carry between their outer ends the shoe 58 which is adapted to normally bear against the guide, 54 at a point slightly below the center at which the levers are pivoted. The levers 56, 56, are similarly pivoted to the adjustable pin 59 and carry a corresponding shoe 60. These levers are all held in their upper position, whereby the shoes 58 and 60 are forced against the guides by adjustable springs 61 and 62 and the adjustment of the pins 57 and 59 is secured by mounting the ends of said pins in sliding blocks 63, the position of which is regulated by the toggle joint 64, which has its central joint regulated by the screws 65 and 66. The adjustment of these screws will take up any undue wear of the shoes 58 and 60.

In order that the pressure of the shoes on the guides may be relieved when it is desired to raise or lower the carriage, the lever 67, which is pivotally mounted on the pin 59 is provided, and a roller, 68, carried on the inner end of said lever bears against the upper edge of one of the levers 55; a pin 69, provided in one of the levers 56 bears against the under side of the lever on which the roller rests. It will be seen that by this arrangement depression of the roller 68 will force the levers 55 and 56 against the tension of the springs 61 and 62, thus relieving the pressure of the shoes 58 and 60 on the guides.

The roller 68 is depressed by the movement of the slide 70 on the roller 71 secured to the lever 67, said movement of the slide being effected by depressing the lever 72 on which the bell crank 73, connected with the lower end of the slide, is formed, the upper portion of the slide being moved by the bell crank 74 which is connected to the lever 72 by the link 75. The forcing over of this slide 70 will elevate the roll 71 and depress the roll 68 at whatever elevation the roll 68 may be in the slide.

The ordinary water tank 76 is carried on the machine for the purpose of cooling the rake and a sectional guard is provided on the forward end of the machine, as indicated at 27 in Fig. 1.

I claim as my invention and desire to secure by Letters Patent:

1. In a gas retort drawing machine, the combination of a rake slidably mounted in the frame of the machine, a differential drum mounted in the frame of the machine and flexible connections between said rake and said differential drum.

2. In mechanism for elevating and reciprocating the rake of a gas retort drawing machine, the combination of a drum formed in two sections, means to interlock said sections, a flexible connection secured to the outer end of said rake and carried over one of the sections of said drum in one direction, a flexible connection secured to the outer end of said rake and carried over the other section of said drum in an opposite direction, and differential gearing associated with the sections of said drum.

3. In a gas retort drawing machine, the combination of a rake slidably mounted in the frame of the machine, a differential drum mounted in the frame of the machine, flexible connections between said rake and said drum, and means to hold the rake and carriage at different positions independently of said flexible connections.

4. In mechanism for elevating and reciprocating the rake of a gas retort drawing machine, the combination of a drum formed in two sections, means to interlock said sections, a flexible connection secured to the outer end of said rake and carried over one of the sections of said drum in one direction, a flexible connection secured to the outer end of said rake and carried over the other section of said drum in an opposite direction, and means for cooling the rake.

In testimony whereof I have hereunto signed my name in the presence of two subscribing witnesses.

HAROLD E. CARPENTER.

In the presence of—
   CLARENCE A. WILLIAMS,
   JAMES C. HERRON.